April 11, 1961 J. B. BIDWELL 2,979,148
VEHICLE STEERING SYSTEM WITH OSCILLATION DAMPING
Filed Nov. 27, 1957
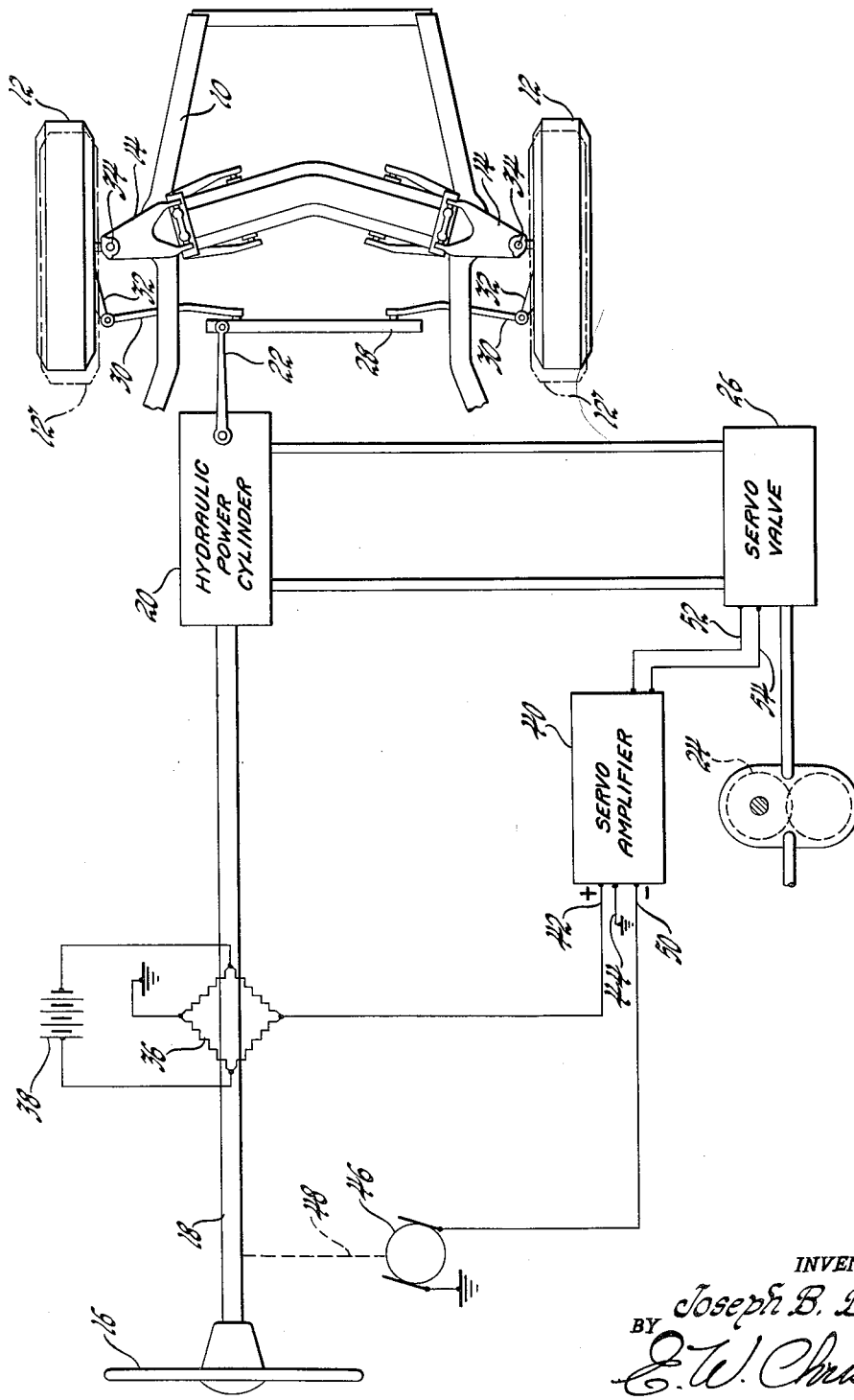
INVENTOR.
Joseph B. Bidwell
BY
E. W. Christen
ATTORNEY

United States Patent Office 2,979,148
Patented Apr. 11, 1961

2,979,148

VEHICLE STEERING SYSTEM WITH OSCILLATION DAMPING

Joseph B. Bidwell, Birmingham, Mich., assignor to General Motors Corporation, Detroit, Mich., a corporation of Delaware Filed Nov. 27, 1957, Ser. No. 699,214

2 Claims. (Cl. 180—79.2)

This invention relates to steering systems for self-propelled vehicles and more particularly to means for preventing oscillations in such systems when the steering wheel is released.

In present-day vehicles a steering system geometry is commonly utilized which has a tendency to return the dirigible wheels of the vehicle to the straight-ahead position or zero steering angle. This characteristic is, of course, highly desirable in the steering system and is developed to any desired degree by the choice of steering system geometry and components. A commonly used design feature which contributes to the development of forces producing this characteristic is the caster angle of the dirigible wheels.

Regardless of the specific manner of developing this characteristic, it is attended with an undesirable secondary effect. The release of the steering wheel during a turn results in overshoot and oscillation of the dirigible wheels about the zero steering angle. This, of course, is a condition of instability which must be overcome by driver effort and which might result in loss of control. In accordance with this invention, this undesirable effect is eliminated and stability is restored by providing a regulated return of the dirigible wheels to the zero steering angle. This is accomplished by providing an opposing torque which prevents oscillation without imposing a load on the steering system by utilizing viscous damping, i.e. a resisting torque proportional to the rate of change of steering angle. This invention is applicable to any conventional steering system but is especially applicable to the well known power steering systems wherein the viscous damping signal may be readily combined with the steering signal. In either case, the stability of the steering system is greatly enhanced without any sensible effect on the effort required of the driver in manipulation of the steering system.

A more complete understanding of this invention may be had from the detailed description which follows taken with the accompanying drawings in which the single figure is a diagrammatic representation of the inventive system.

Referring now to the drawing, there is shown an illustrative embodiment of the invention in a self-propelled vehicle provided with a power steering system. In this illustrative embodiment, the vehicle frame 10 supports a pair of dirigible wheels 12 on suitable suspension members 14. The manual steering wheel 16 is connected through a steering shaft 18 to a power actuator 20, suitably of that type shown in the U.S. Patent 2,865,462 to William F. Milliken et al filed March 1, 1956, for "Automotive Vehicle Having Free Control and Stability Features" and assigned to the assignee of the present invention. In this arrangement, the manual effort is transmitted through the steering shaft 18 to the pitman arm 22 and a hydraulic servomotor included in the power actuator 20 provides power boost corresponding to the driver applied torque. The hydraulic servomotor included in the power actuator 20 is energized from a hydraulic pump 24 in accordance with the regulating action of the servo valve 26. The pitman arm 22 is pivotally connected with the drag link 28 of a conventional parallelogram steering linkage. The drag link is connected to each of the dirigible wheels 12 through the respective tie rods 30 and radius arms 32. The steering system just described includes in its geometry a caster angle for dirigible wheels 12 which is provided by inclination of the axes 34 of the respective kingpins or steering knuckle pivots away from the vertical direction. The presence of this caster angle, indicated by the phantom lines 12', is effective in a well known manner to cause forces to be developed in the steering system which tend to return the dirigible wheels 12 to the straight-ahead direction which corresponds to zero steering angle.

In order to control the power actuator 20 in accordance with the driver applied torque on the steering wheel 16, there is provided a steering signal generator such as a torque responsive transducer or pick-off associated with the steering shaft. This steering signal generator suitably comprises a strain gauge bridge 36 mounted on the steering shaft 18 and excited by a voltage source 38 connected across one pair of diagonal terminals of the bridge circuit. A steering signal voltage corresponding in amplitude and phase or polarity to the magnitude and direction of driver applied torque is developed across the other pair of diagonal terminals of the bridge circuit. This steering signal voltage is applied to the servo amplifier 40 across the input terminals 42 and 44.

In accordance with this invention, the power actuator is also controlled by a viscous damping signal to prevent oscillation of the system upon return of the dirigible wheels to zero steering angle. A rate signal or tachometer generator 46 has its rotor mechanically coupled through a linkage 48 with the steering shaft 18 for rotation therewith. Accordingly, the generator 46 develops an output voltage corresponding in amplitude and phase or polarity to the time rate of change of the steering angle of the dirigible wheels of the vehicle. The output terminals of the generator 46 are connected across the input terminals 50 and 44 of the servo amplifier.

The servo amplifier 40 is adapted to combine the steering and rate signal voltages in an algebraic manner and to amplify the result control voltage for utilization in actuating the servo valve 26. These signal voltages are applied in phase opposition in the sense that a right hand turn, for example, will develop a steering signal of one phase or polarity while the same turn will develop a rate signal of the opposite polarity, as indicated by the instantaneous polarity symbols in the drawing. Thus the servo amplifier develops an output voltage which corresponds in amplitude and phase or polarity corresponding to the algebraic sum of the input voltages and the output terminals are connected to the input terminals 52 and 54 of the servo valve 26. Accordingly, the servo valve controls the energization of the power actuator 20 in accordance with the amplitude and phase or polarity of the servo amplifier output voltage.

In operation of the inventive system, both the steering signal and rate signal voltages control the energization of the power actuator. When steering effort is exerted by the driver, as in negotiating a turn, the steering signal voltage developed by the strain gage bridge and corresponding to driver applied torque will greatly predominate over the rate signal voltage developed by the generator 46 because the rate of change of steering angle is of very low value. However, when the driver releases the steering wheel, the external forces acting through the steering system tend to return the dirigible wheels to the zero steering angle with relatively high velocity. Accordingly, the rate signal voltage will be of a relatively high value while the steering signal voltage will be sensibly zero. Therefore, the rate signal voltage acting through the servo amplifier and servo valve will cause energization of the power actuator in accordance with its amplitude and phase or polarity to cause a torque to be developed in opposition to the steering system forces which return the dirigible wheels to the straight ahead position. This opposing torque is, of course, variable in accordance with the speed of return of the dirigible wheels and diminishes to zero as the zero steering angle is approached. Accordingly, the return of the dirigible wheels is accomplished without overshoot or oscillation and the stability of the steering system is greatly improved.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claims.

I claim:

1. In combination with a self-propelled vehicle having dirigible wheels, a manually controlled steering mechanism including a power actuator connected with said wheels, a steering signal generator for developing a signal quantity corresponding to the driver applied torque on said steering mechanism, a rate signal generator connected to said steering mechanism for developing a signal quantity corresponding to the time rate of change of the steering angle of said dirigible wheels, and control means interconnecting said generators with said power actuator for energizing said power actuator in accordance with the algebraic summation of the steering and rate signal quantities.

2. In combination with a self-propelled vehicle having dirigible wheels in a steering system which tends to return the wheels to zero steering angle, a manually controlled steering mechanism including a power actuator connected with said wheels, a steering signal generator on said mechanism for developing a steering signal voltage which corresponds in amplitude and phase to the magnitude and direction of driver applied torque on said mechanism, a tachometer generator mechanically coupled with the steering mechanism for developing a rate signal voltage corresponding in amplitude and polarity to the time rate of change of the steering angle of the dirigible wheels, and control means interconnecting said generators with said power actuator for energizing the power actuator in accordance with the algebraic summation of the steering and rate signal voltages.

References Cited in the file of this patent

UNITED STATES PATENTS

| | | |
|---|---|---|
| 2,060,804 | Friestedt | Nov. 17, 1936 |
| 2,191,125 | Collins | Feb. 20, 1940 |
| 2,229,394 | Stinne | Jan. 21, 1941 |
| 2,555,649 | Krotz | June 5, 1951 |
| 2,734,589 | Groen | Feb. 14, 1956 |
| 2,754,465 | Brier | July 10, 1956 |
| 2,762,585 | Eaton | Sept. 11, 1956 |
| 2,798,567 | Staude | July 9, 1957 |
| 2,819,092 | Proctor et al. | Jan. 7, 1958 |
| 2,851,795 | Sherman | Sept. 16, 1958 |